(12) United States Patent
Li et al.

(10) Patent No.: US 12,246,291 B2
(45) Date of Patent: Mar. 11, 2025

(54) METAL ORGANIC FRAMEWORK GLASS MEMBRANE AND PREPARATION METHOD THEREOF

(71) Applicant: NINGBO UNIVERSITY, Zhejiang (CN)

(72) Inventors: Yanshuo Li, Zhejiang (CN); Hua Jin, Zhejiang (CN)

(73) Assignee: NINGBO UNIVERSITY, Zhejiang (CN)

( * ) Notice: Subject to any disclaimer, the term of this patent is extended or adjusted under 35 U.S.C. 154(b) by 367 days.

(21) Appl. No.: 17/754,349

(22) PCT Filed: Nov. 30, 2020

(86) PCT No.: PCT/CN2020/132605
§ 371 (c)(1),
(2) Date: Mar. 30, 2022

(87) PCT Pub. No.: WO2021/063426
PCT Pub. Date: Apr. 8, 2021

(65) Prior Publication Data
US 2022/0331745 A1  Oct. 20, 2022

(30) Foreign Application Priority Data

Sep. 30, 2019 (CN) .......................... 201910941561.4
Dec. 5, 2019 (CN) .......................... 201911231111.2

(51) Int. Cl.
| | | |
|---|---|---|
| *B01D 67/00* | (2006.01) | |
| *B01D 53/22* | (2006.01) | |
| *B01D 69/10* | (2006.01) | |
| *B01D 71/04* | (2006.01) | |
| *B01D 71/06* | (2006.01) | |

(52) U.S. Cl.
CPC ....... *B01D 67/0079* (2013.01); *B01D 53/228* (2013.01); *B01D 67/00411* (2022.08); *B01D 69/106* (2022.08); *B01D 69/108* (2022.08); *B01D 71/04* (2013.01); *B01D 71/06* (2013.01); *B01D 2323/081* (2022.08); *B01D 2323/12* (2013.01); *B01D 2323/219* (2022.08)

(58) Field of Classification Search
CPC ........ B01D 53/22; B01D 67/00; B01D 69/10; B01D 71/02; B01D 71/04; B01D 71/06
See application file for complete search history.

(56) References Cited

U.S. PATENT DOCUMENTS

| | | | |
|---|---|---|---|
| 9,375,678 B2 | 6/2016 | Nair et al. | |
| 2020/0269194 A1* | 8/2020 | Al-Maythalony | B01D 69/02 |

FOREIGN PATENT DOCUMENTS

| | | | | |
|---|---|---|---|---|
| CN | 101912737 A | | 12/2010 | |
| CN | 106902642 A | | 6/2017 | |
| CN | 108295672 A | * | 7/2018 | .......... B01D 53/228 |
| CN | 109705808 A | | 5/2019 | |
| CN | 110090621 A | | 8/2019 | |
| CN | 110975648 A | | 4/2020 | |
| JP | 2019118860 A | | 7/2019 | |

OTHER PUBLICATIONS

Bennett, Thomas D. et al.; "Melt-Quenched Glasses of Metal-Organic Frameworks"; Journal of the American Chemical Society; 2016, vol. 138, Issue No. 10, Feb. 17, 2016; pp. 3484-3492.
Park et al.; "Exceptional Chemical and Thermal Stability of Zeolitic Imidazolate Frameworks"; PNAS.org; vol. 103; No. 27; Jul. 5, 2016; pp. 10186-10191.

* cited by examiner

*Primary Examiner* — Sharon Pregler
(74) *Attorney, Agent, or Firm* — NKL Law; Allen Xue

(57) ABSTRACT

A metal organic framework glass membrane and a preparation method thereof are provided. The preparation method includes a step of heating a crystalline metal organic framework material to the melting temperature at a rate of 1-15° C./min and then naturally cooling the crystalline metal organic framework material. The crystalline metal organic framework material contains a metal node and a ligand A. The metal node is a zinc ion and/or a cobalt ion and the ligand A is imidazole or phosphoric acid. The metal organic framework glass membrane has a wide range of membrane-forming conditions, and the material thereof can be melted without being decomposed within a control range to form a continuous glass layer with good repeatability.

9 Claims, 15 Drawing Sheets

METAL ORGANIC FRAMEWORK GLASS MEMBRANE AND PREPARATION METHOD THEREOF

TECHNICAL FIELD

The present invention relates to the technical field of membrane separation, and particularly, relates to a preparation method of a metal organic framework glass membrane and the application thereof in the separation of gas mixtures.

BACKGROUND ART

Glass generally refers to an amorphous inorganic non-metallic material. Usually, inorganic minerals are used as the main raw materials and mixed with a certain proportion of metal oxides or salts to prepare colored glass. With the development of polymers, some transparent plastics are also included in the category of glass, called organic glass.

Most glass materials are prepared by melting and quenching, and the viscosity increases during rapid cooling, preventing crystallization and thereby promoting the formation of glass. From a chemical point of view, traditional melt-quenched glasses can be divided into three main categories: inorganic non-metallic glass, organic glass, and metallic glass, whose chemical bonds are ionic covalent mixed bonds, covalent bonds and metallic bonds, respectively. Recently, in the Journal of the American Chemical Society (DOI: 10.1021/jacs.5b13220), the research group of T. D. Bennett of University of Cambridge, UK, successfully prepared a new type of melt-quenched glass: metal organic framework (MOF) glass. The glass is an inorganic-organic hybrid glass formed by the connection of metal ions and organic ligands through coordination bonds. Its chemical and bond structure characteristics are different from those of the traditional three categories of glasses, and thus, metal organic framework glass is classified as a "melt-quenched glass of the fourth category". This study only reports some basic properties of this new type of glass, such as melting point, chemical composition, formation process, gas adsorption, etc. At present, the study is only a research on the material itself, and the material has not been prepared into a practical product for practical application. However, the present invention provides a feasible strategy to successfully prepare the material into a separation membrane and apply the membrane to actual gas separation.

In the actual research process, it is found that metal organic framework materials are usually directly thermally decomposed at 200-600° C., and only a few metal organic framework materials undergo a melting process to form glass before decomposition. The powder of this type of material can be used for gas adsorption. However, the use of only powder for adsorption and separation of gas can only be performed intermittently. After each time the powder is saturated with adsorption, it needs to be desorbed again. Due to the low adsorption capacity of metal organic framework glass, the direct use of powder adsorption is not economical. Membrane separation is a process of separating, purifying and concentrating different components of a mixture using the selectivity of membranes, with the characteristics of low energy consumption and environmental protection. Meanwhile, membrane separation is easy to be coupled with other separation processes and can be operated continuously. The metal organic framework is prepared into a gas separation membrane, by which not only the pore diameter screening characteristics of the material can be used to achieve separation, but also the thermal stability of the material can be used to achieve high temperature operation. But as of the present patent application, there is no suitable method to prepare such a material into membranes. In conclusion, metal organic framework glass material, as a new generation of melt-quenched glass, is a very good membrane material for gas separation at high temperature due to its unique structure and excellent temperature resistance. It is of great significance for the application and development of such materials to study to obtain a suitable membrane-making method for this type of material.

SUMMARY OF INVENTION

The purpose of the present invention is to provide a type of high-performance gas separation membrane using metal organic framework glass as material.

Thus, the present invention first provides a preparation method of metal organic framework glass membrane, including a step of heating a crystalline metal organic framework material to a melting temperature at a rate of 1-15° C./min and then naturally cooling the crystalline metal organic framework material, wherein the crystalline metal organic framework material contains a metal node and a ligand A; the metal node is a zinc ion and/or a cobalt ion; and the ligand A is imidazole or phosphoric acid.

Meanwhile, the present invention also provides a metal organic framework glass membrane prepared using the method.

The method of the present invention is adopted to synthesize the metal organic framework glass membrane, wherein the membrane-forming conditions are wide and the material can be melted without being decomposed within a control range to form a continuous glass layer with good repeatability. The prepared membrane product has good temperature resistance and has a good application prospect in the field of gas separation.

DESCRIPTION OF EMBODIMENTS

Figure 1:
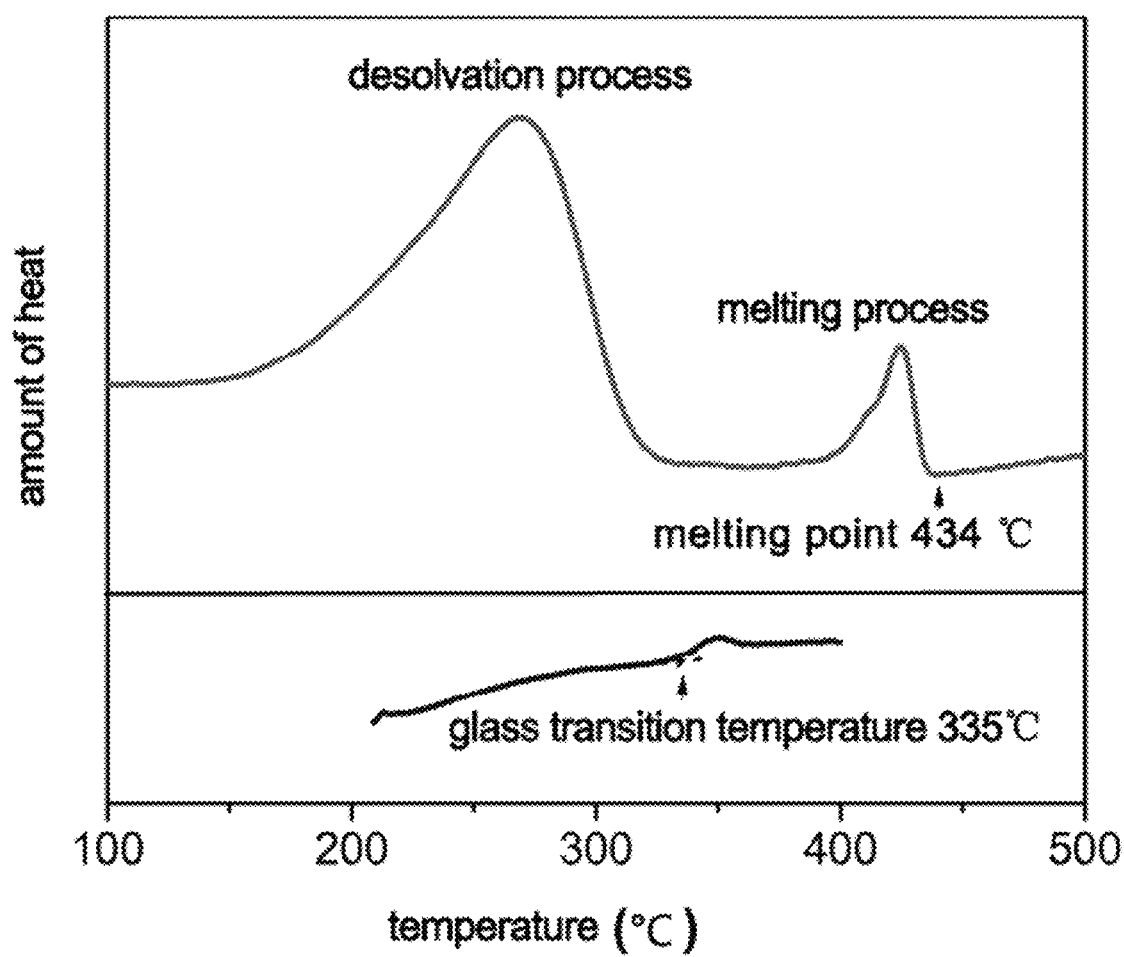
FIG. 1 is the differential scanning calorimetry measurement result chart of ZIF-62 powder.

The present invention is intended to provide a metal organic framework glass membrane (MOF glass membrane) and a preparation method thereof, and the preparation method includes a step of heating a crystalline metal organic framework material to the melting temperature of the crystalline metal organic framework material at a rate of 1-15° C./min and then naturally cooling the crystalline metal organic framework material, wherein the crystalline metal organic framework material contains a metal node and a ligand A; the metal node is a zinc ion and/or a cobalt ion; and the ligand A is imidazole or phosphoric acid. A typical material representative is ZIF-4, which is composed of zinc ion metal node and ligand imidazole.

In a more preferred technical solution, the crystalline metal organic framework material not only contains the metal node and the ligand A, but also contains a ligand B. The ligand B is selected from benzmidazole, 2-methylbenzimidazole, 5-methylbenzimidazole, 5,6-dimethylbenzimidazole, 5-chlorobenzimidazole, 5-hydroxybenzimidazole and triazole.

Here, the aforementioned metal node, ligand A and ligand B can be freely combined to form suitable crystalline metal organic framework materials, and examples of these materials include but are not limited to: ZIF-4 (zinc ion/cobalt ion, imidazole), ZIF-62 (zinc ion/cobalt ion, imidazole, benzimidazole), ZIF-76 (zinc ion/cobalt ion, imidazole, 5-chlorobenzimidazole), TIF-4 (zinc ion, imidazole, 5-methylbenzimidazole), GIS (zinc ion, imidazole), crosslinked polymer 1 (zinc ion, phosphoric acid, imidazole), crosslinked polymer 2 (zinc ion, phosphoric acid, triazole), crosslinked polymer 3 (zinc ion, phosphoric acid, benzimidazole), and crosslinked polymer 4 (zinc ion, phosphoric acid, 2-methylimidazole). In the technical solution of the present invention, the crystalline metal organic framework materials composed of metal node, ligand A and ligand B have better effects. Especially, those materials containing imidazole as ligand A and containing benzimidazole, 5-methylbenzimidazole or 5-chlorobenzimidazole as ligand B, such as ZIF-62 (zinc ion/cobalt ion, imidazole, benzimidazole), TIF-4 (zinc ion, imidazole, 5-methylbenzimidazole), and ZIF-76 (zinc ion/cobalt ion, imidazole, 5-chlorobenzimidazole), have better effects.

In the preparation method of the MOF glass membrane of the present invention, the crystalline MOF material is converted into MOF glass by a melt-quenching method, and the melting temperature has different adaptation values according to the selection of different MOF materials, and the general selection standard of the melting temperature is: above the melting point of the material to be measured, and below the decomposition temperature of the material. Of course, this is only the most basic guiding principle, and there are still many factors that need to be considered when applying this principle to a melting process of a specific material. In actual tests, there are still many MOF materials that cannot be successfully melted in this temperature range. In the present invention, the melting temperature of MOFs is preferably 370-600° C., and the most preferred ZIF-62 and ZIF-76 materials have a melting temperature of 440-450° C. In the melting process, the material is heated to the melting temperature, and the heating rate is preferably 10±2° C./min.

In the technical scheme of the present invention, the crystalline metal organic framework material can be prepared using various methods in the industry, and in the present invention, the solvothermal method is adopted to synthesize the crystalline metal organic framework material. The solvothermal method is developed on the basis of the hydrothermal method, and refers to a synthetic method in which an organic or non-aqueous solvent is used as a solvent to react the original mixture at a certain temperature and autogenous pressure of the solution in a closed system such as an autoclave. The solvothermal method is different from hydrothermal reaction in that the solvent used is organic instead of water. In the present invention, the solvothermal method synthesis system for synthesizing the crystalline metal organic framework material is composed of metal ion, organic ligand A, organic ligand B and organic solvent in a molar ratio of 1:4.5-30:0-5:100-500, wherein the organic solvent is selected from N,N-dimethylformamide, N,N-dimethylacetamide, water, methanol and ethanol or a mixture thereof. The preferred organic solvent is N,N-dimethylformamide.

The transformation of crystalline metal organic framework material into metal organic framework glass material can be achieved by melt-quenching or sintering. The purpose is to convert crystalline materials with regular lattice structure into inorganic-organic hybrid materials with network structure formed by metal ion and organic ligand connected via coordination bond. However, in the inventor's study, it has been found that the transformation of materials by different methods results in unpredictable performance of the products in gas separation performance. Specifically, the results presented in the examples can be referred to. MOF glass materials, which are usually made by tablet pressing and sintering, do not have applicable gas separation characteristics. In the present invention, the melt-quenching method is selected to carry out phase conversion. This method is especially suitable for the preparation of supported MOF glass membrane. Correspondingly, the preparation material is preferably a supported crystalline metal organic framework material with a support pore diameter of 70 nm-1 To prepare supported crystalline MOFs loaded with crystalline organic framework materials, in-situ growth method, secondary growth method, vacuum-assisted method, spin coating method, etc. can be used. The support is preferably selected from $\alpha$-$Al_2O_3$ support, $\gamma$-$Al_2O_3$ support, $TiO_2$ support and stainless steel support.

The present invention will be further described below with reference to the accompanying drawings and non-limiting examples.

Example 1

Preparation of ZIF-62 Glass Self-Supporting Membrane by Traditional Tablet Pressing and Sintering Method
  (1) Preparation of ZIF-62 powder: Mix zinc nitrate hexahydrate, imidazole, benzimidazole, and DMF uniformly in a molar ratio of 1:12.5:3:200. Put 50 mL of solution in the reactor, react at 130° C. for 48 h, use fresh DMF to wash the product three times and dry the product in vacuum at 100° C. to obtain ZIF-62 powder.
  (2) Tablet pressing: Place 0.1 g of the prepared ZIF-62 powder in the tank of the tablet pressing machine, and keep the powder for 15 min under the condition of 15 Mpa to obtain self-supporting ZIF-62 tablets.

Figure 2:
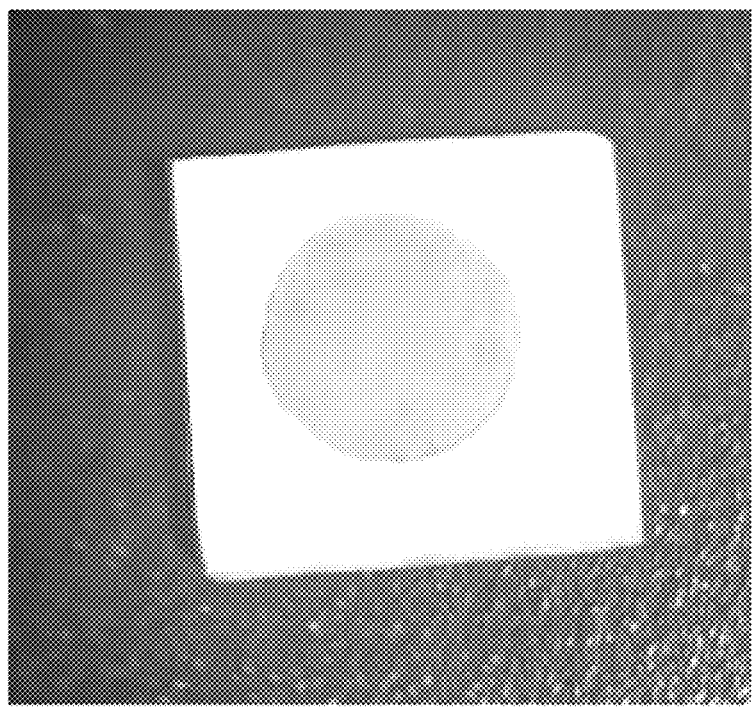
FIG. 2 is the actual view of the glass membrane obtained using ZIF-62 through traditional tablet pressing and sintering.

(3) Melt-quenching: First, measure ZIF-62 powder by differential scanning calorimetry method, and by analyzing the heat change of the material during the heating process (FIG. 1), obtain that the melting point of ZIF-62 material is 434° C. and the glass transition temperature is 335° C., and that at 440° C.-500° C., ZIF-62 can undergo a melting process without decomposition. Transfer the ZIF-62 tablets to a tube furnace, and increase the temperature from room temperature to 440° C. at a heating rate of 10° C./min under the protection of argon, and then stop the heating, and rapidly cool the tablets to room temperature. The photograph of ZIF-62 tablet after melt-quenching is shown in FIG. 2, the membrane is non-dense, and it is found that the separation membrane does not have any gas separation performance after a test using the Wicke-Kallenbach technique.

Example 2

Preparation of Supported ZIF-62 Glass Membrane by Solvothermal Method:
(1) Growth of seed crystals: Mix zinc nitrate hexahydrate, imidazole, benzimidazole, and DMF uniformly in a molar ratio of 1:12.5:3:200. Put 10 mL of the solution in a 25 mL beaker, place an α-$Al_2O_3$ support sheet with a surface pore diameter of 70 nm at the bottom of the beaker and leave it to stand still for 48 h.
(2) Melt-quenching: Dry the support sheet with the grown seed layer at 100° C. for 2 h, and then transfer the support sheet to a tube furnace, and increase the temperature from room temperature to 440° C. at a heating rate of 10° C./min under the protection of argon, and then stop the heating, and rapidly cool the support sheet to room temperature.

Figure 3:
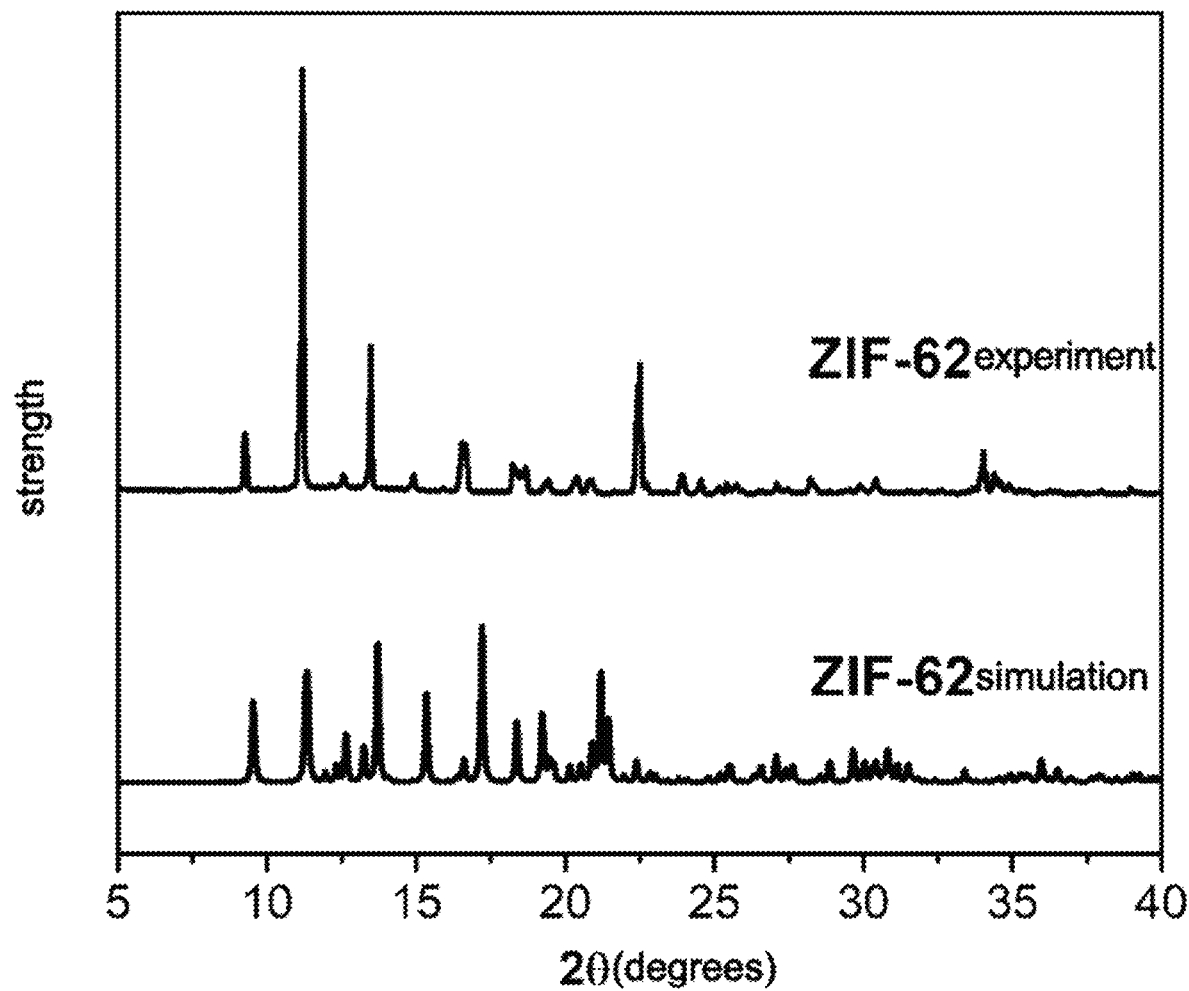
FIG. 3 is the X-ray diffraction measurement result chart of ZIF-62 powder.
Figure 4:
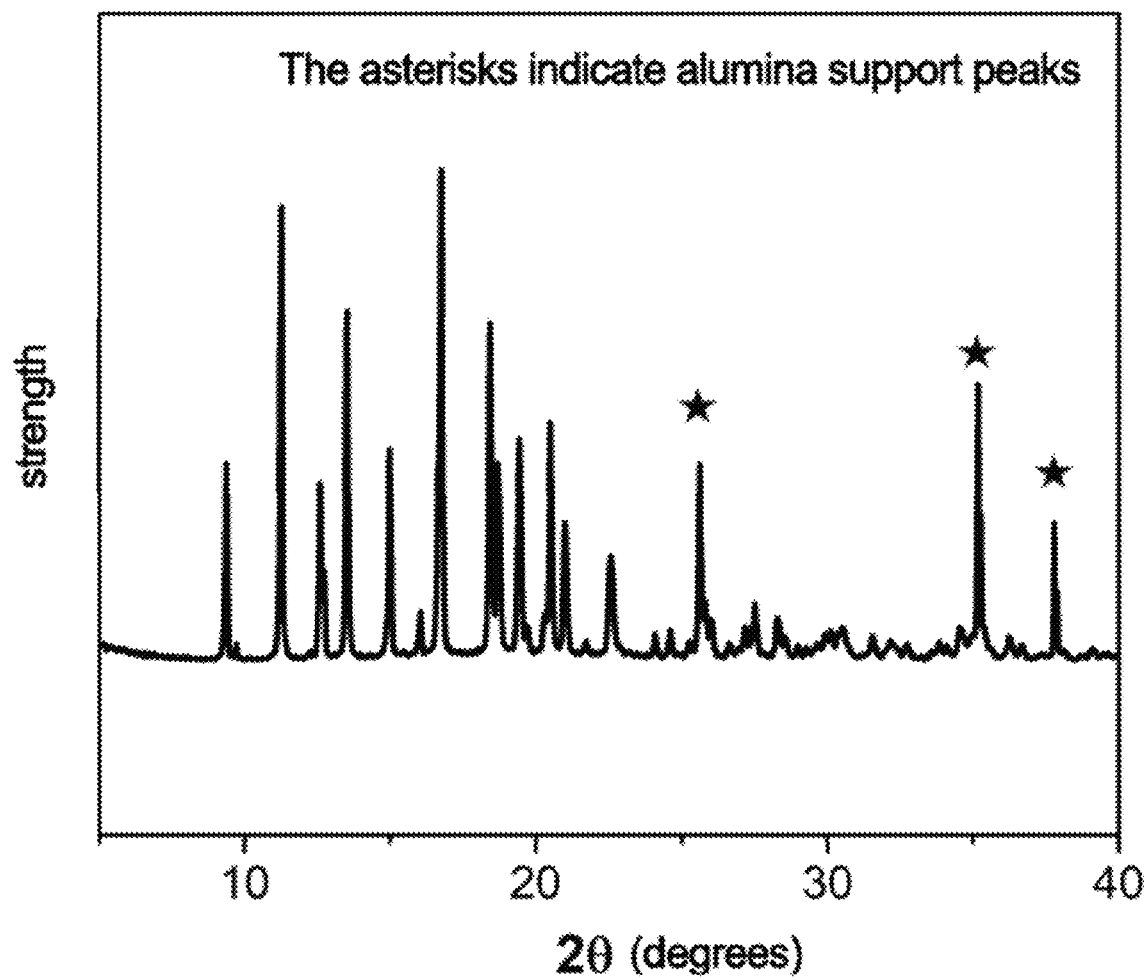
FIG. 4 is the X-ray diffraction measurement result chart of ZIF-62 seed layer.
Figure 5:
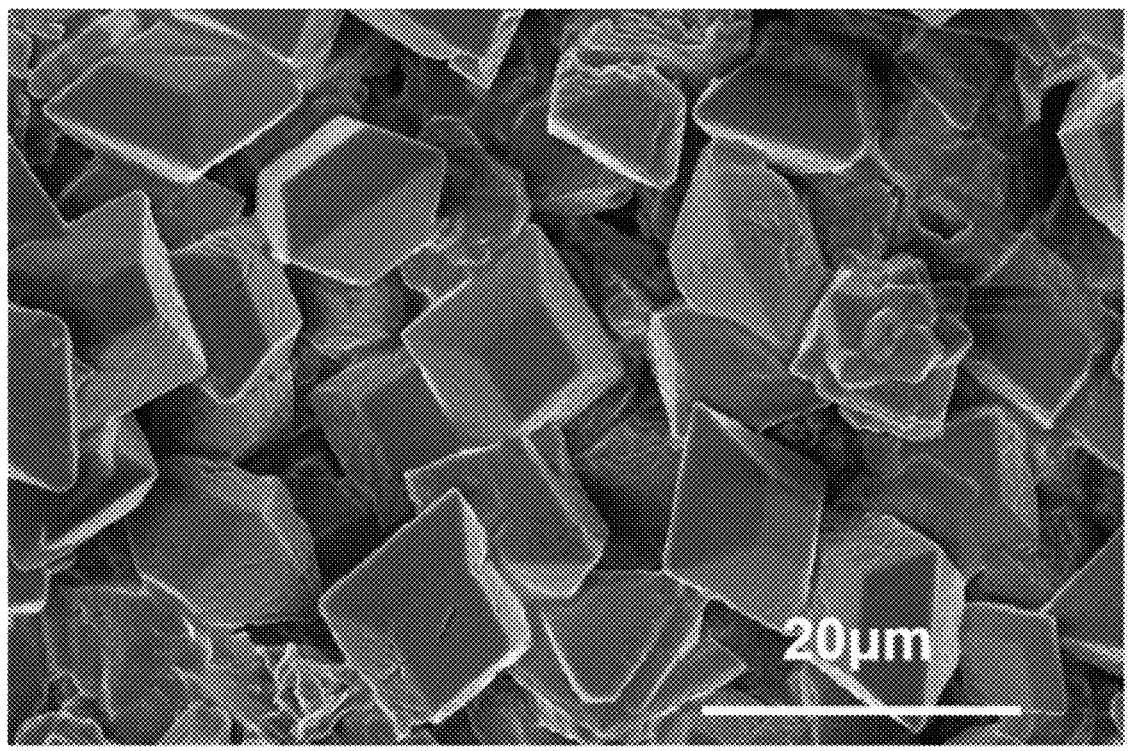
FIG. 5 is the scanning electron microscope image of ZIF-62 seed layer.

The ZIF-62 glass membrane is characterized as follows: ZIF-62 powder (FIG. 3) and ZIF-62 seed layer (FIG. 4) are measured by X-ray diffraction, and the crystal structures of the materials are further determined according to the measured peak positions. Comparing with the corresponding crystal simulation data, it can be obtained that the ZIF-62 seed layer retains the cag topology. It can be seen from the scanning electron microscope image (FIG. 5) of the ZIF-62 seed layer that the particle size of ZIF-62 seed crystals is in the range of 10-15 μm and is relatively uniform.

Figure 6:
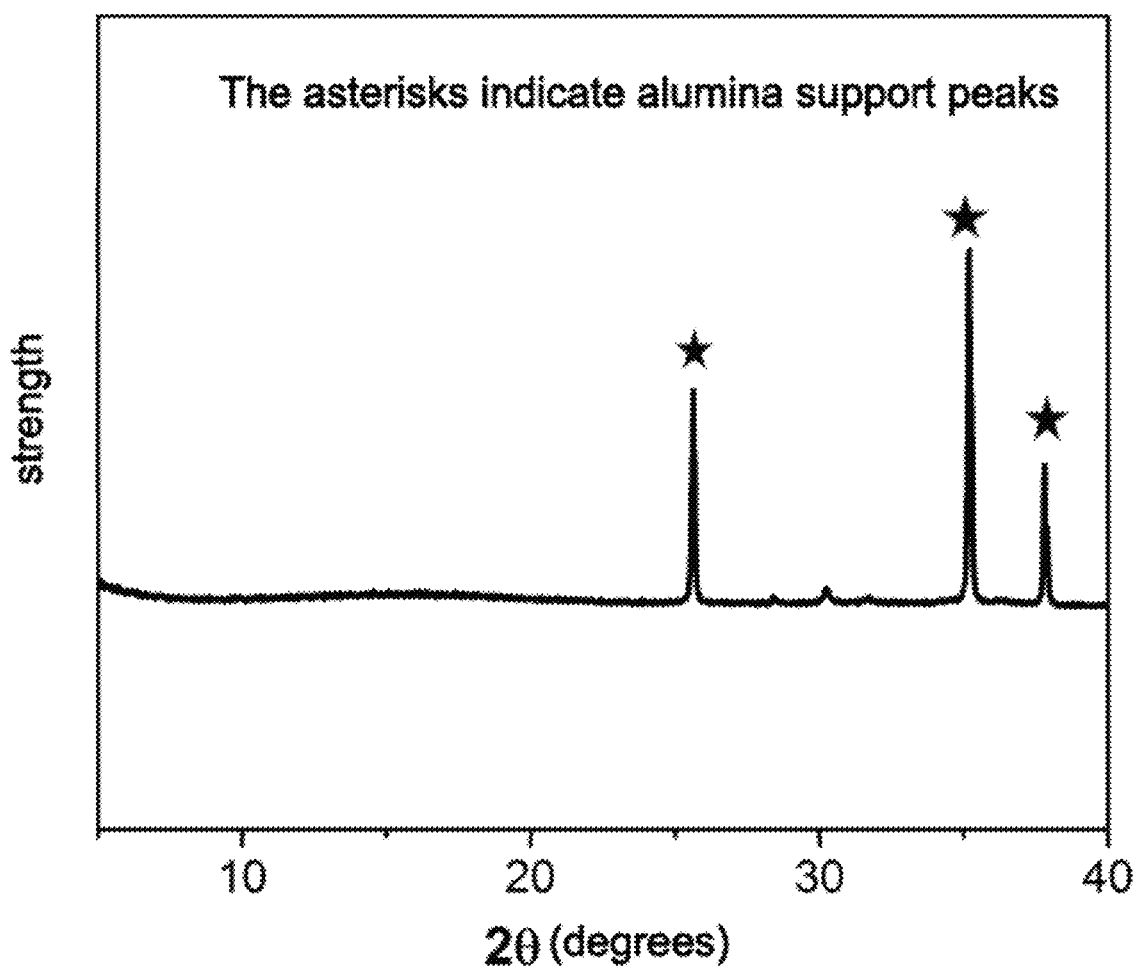
FIG. 6 is the X-ray diffraction measurement result chart of ZIF-62 glass membrane.
Figure 7:
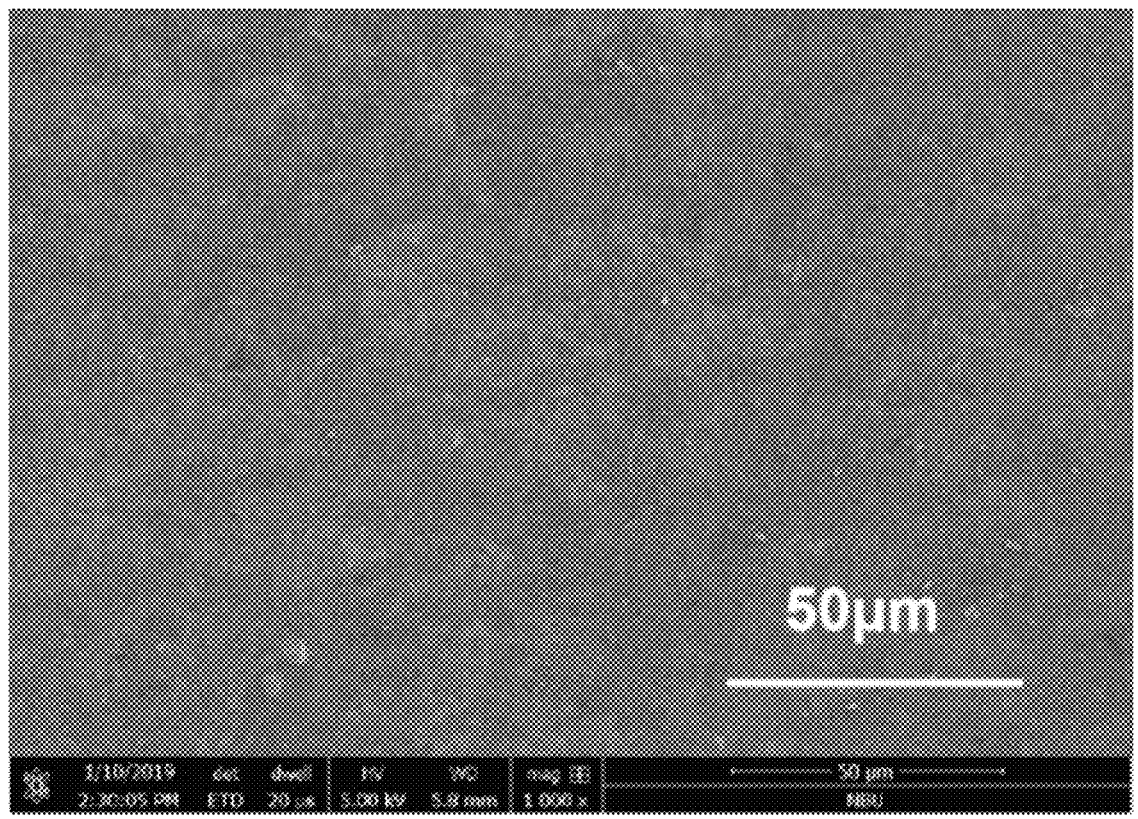
FIG. 7 is the scanning electron microscope image of ZIF-62 glass membrane.
Figure 8:
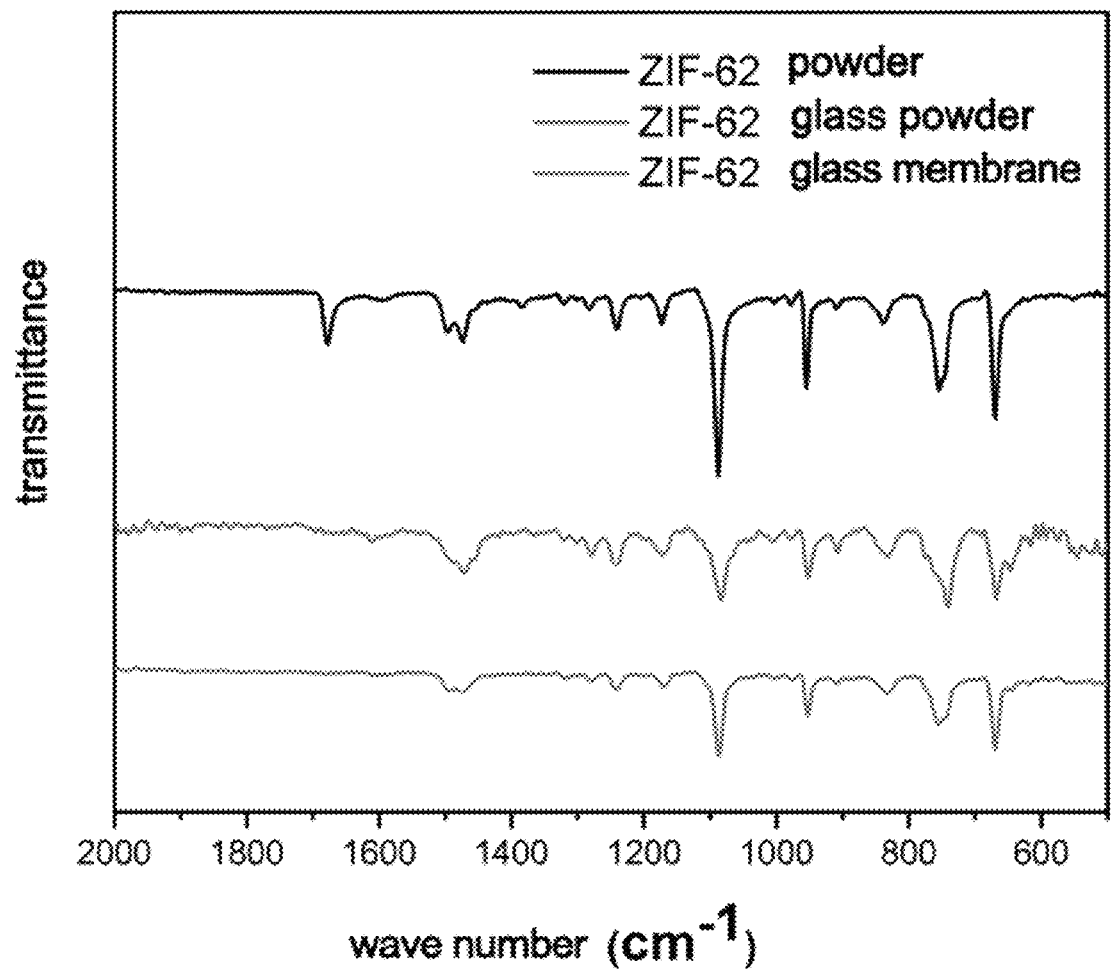
FIG. 8 is the result chart of the infrared measurement of ZIF-62 powder and ZIF-62 glass membrane.
Figure 9:
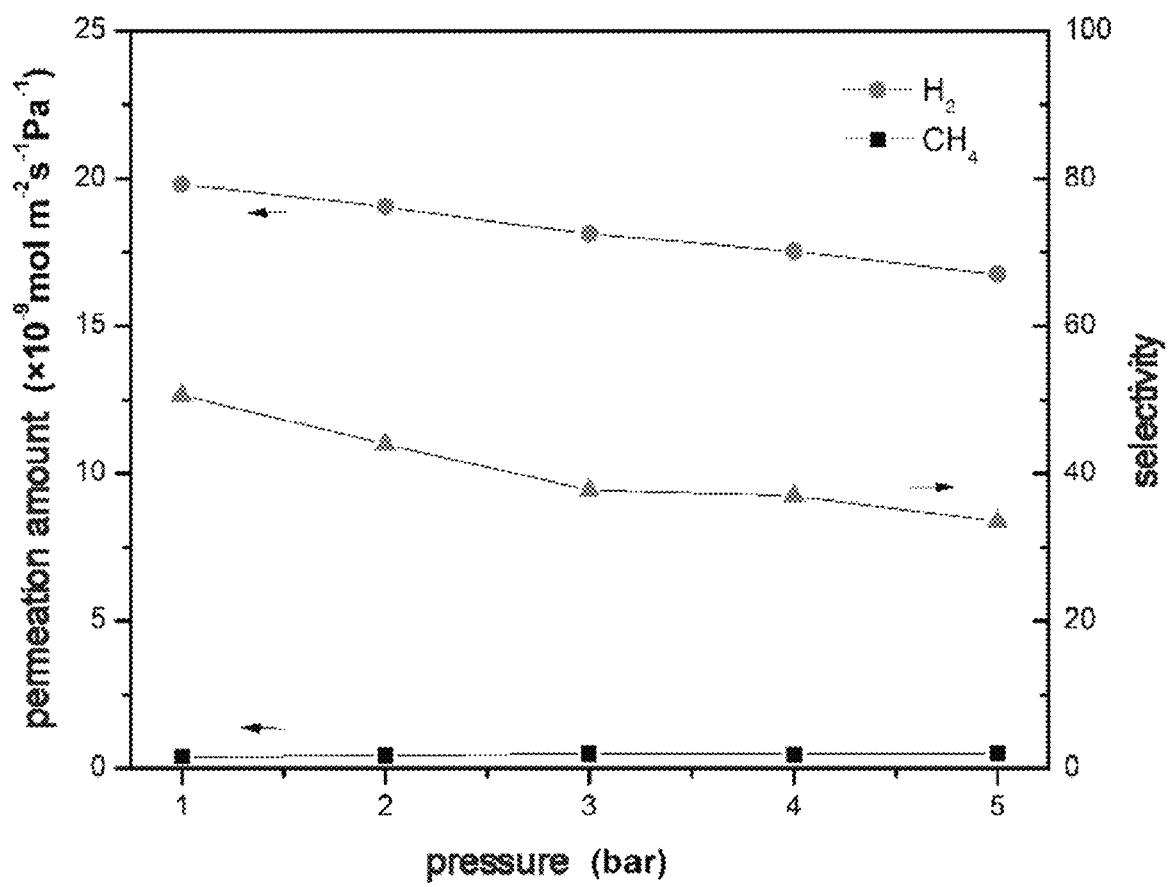
FIG. 9 is the chart showing the separation performance of ZIF-62 glass membrane for $H_2/CH_4$.

Comparing the X-ray diffraction pattern of the ZIF-62 glass membrane (FIG. 6) with the X-ray diffraction pattern of the ZIF-62 seed layer (FIG. 4), the results show that after ZIF-62 undergoes a melting process, the topological structure of cag is transformed into an amorphous structure. It can be seen from the scanning electron microscope image (FIG. 7) of the ZIF-62 glass membrane that during the melting process of ZIF-62, the crystal melts, and the crystal morphology changes and spreads into a continuous membrane at high temperature. It can be seen from the infrared image (FIG. 8) of ZIF-62 powder and ZIF-62 glass membrane that the DMF solvent in the pores of ZIF-62 is further removed after melting, and the ligand does not decompose at high temperature. The Wicke-Kallenbach technique is used to test the $H_2/CH_4$ separation performance of the obtained ZIF-62 glass membrane (FIG. 9). On the upstream side of the membrane, a mixed gas of $H_2$ and $CH_4$ is introduced in a molar ratio of 1:1, and helium is introduced to the downstream side of the membrane for purging. For the ZIF-62 glass membrane of the present invention, the $H_2/CH_4$ selectivity is as high as 50.

Example 3

Preparation of Supported ZIF-76 Glass Membrane:
(1) Growth of seed crystals: Mix zinc nitrate hexahydrate, imidazole, 5-methyl-benzimidazole, and DMF uniformly in a molar ratio of 1:10:2:200. Put 10 mL of the solution in a 25 mL reactor, place an α-$Al_2O_3$ support sheet with a surface pore diameter of 70 nm at the bottom of the reactor and conduct a solvothermal reaction at 110° C. for 12 h.
(2) Melt-quenching: Dry the support sheet with the grown seed layer at 100° C. for 2 h, and then transfer the support sheet to a tube furnace, and increase the temperature from room temperature to 460° C. at a heating rate of 10° C./min under the protection of argon, and then stop the heating, and rapidly cool the support sheet to room temperature.

Figure 10:
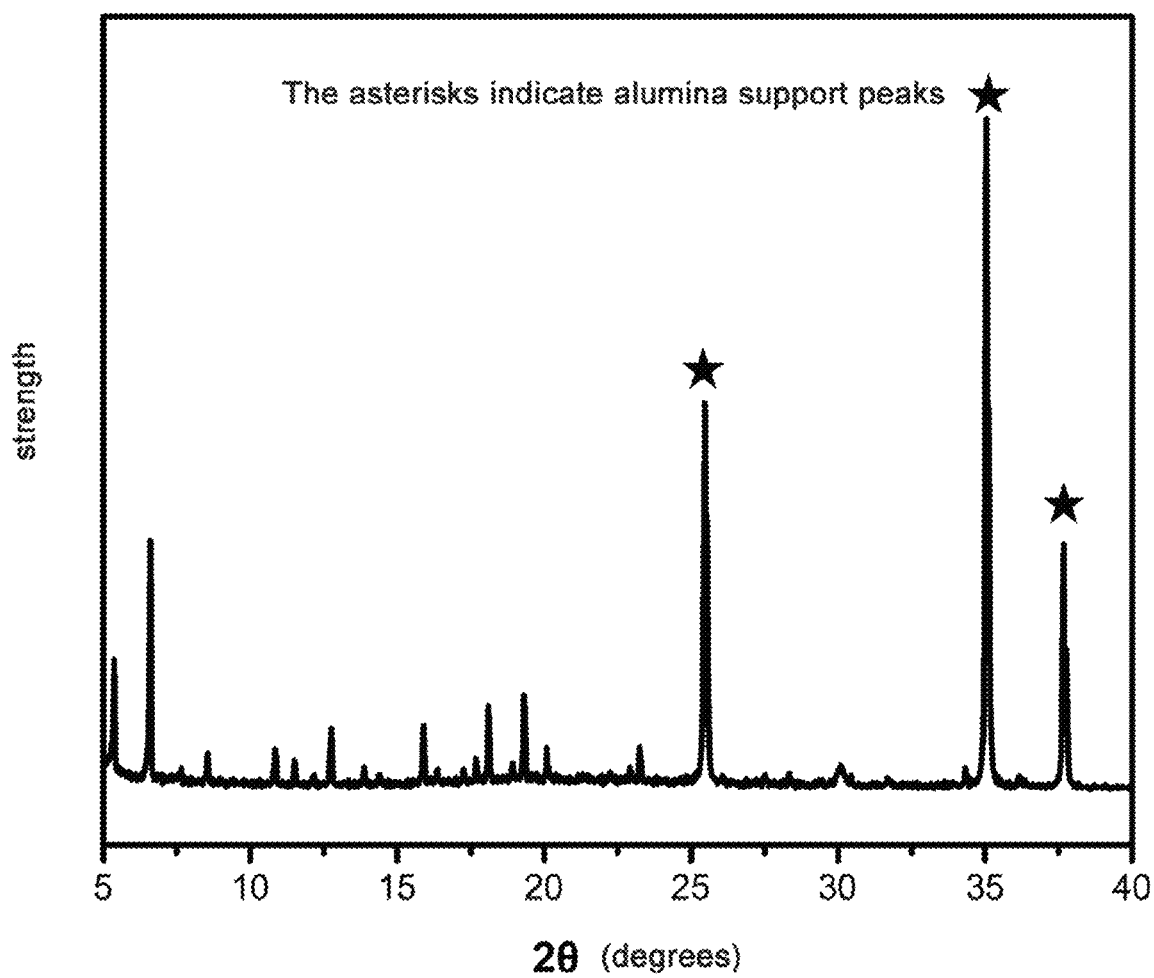
FIG. 10 is the X-ray diffraction measurement result chart of ZIF-76 seed layer.
Figure 11:
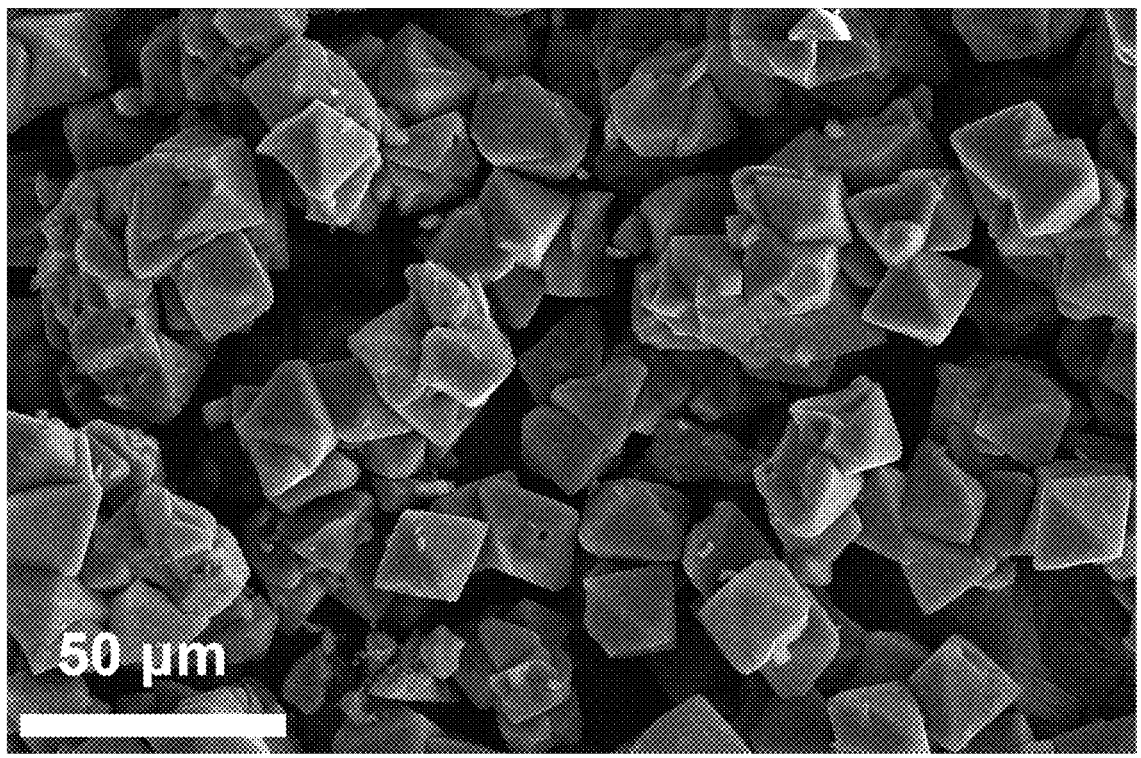
FIG. 11 is the scanning electron microscope image of ZIF-76 seed layer.

The ZIF-76 glass membrane is characterized as follows: ZIF-76 seed layer (FIG. 10) is measured by X-ray diffraction, and the crystal structures of the materials are further determined according to the measured peak positions. Comparing with the corresponding crystal simulation data, it can be found that the ZIF-76 seed layer retains the lta topology. It can be seen from the scanning electron microscope image (FIG. 11) of the ZIF-76 seed layer that the particle size of ZIF-76 seed crystals is about 20 μm and is relatively uniform.

Figure 12:
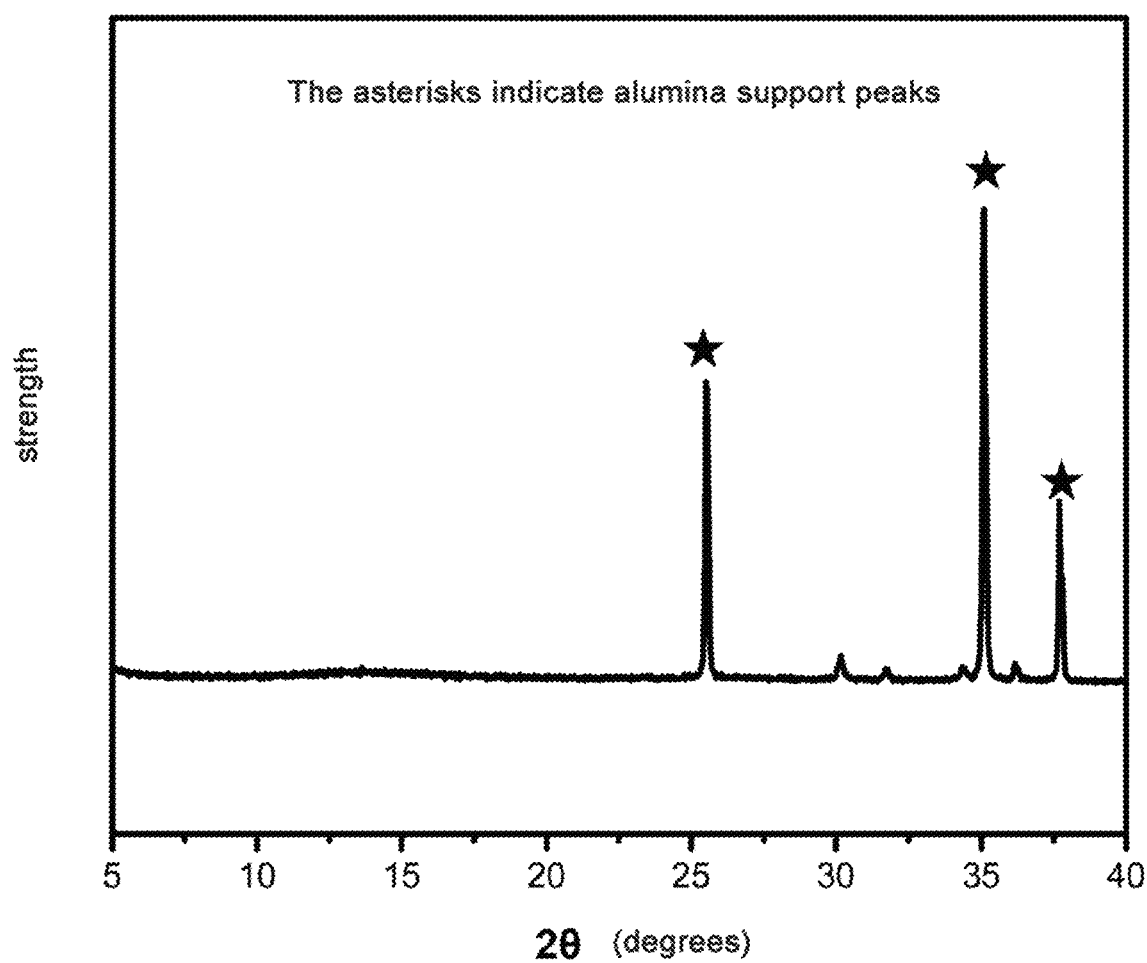
FIG. 12 is the X-ray diffraction measurement result chart of ZIF-76 glass membrane.
Figure 13:
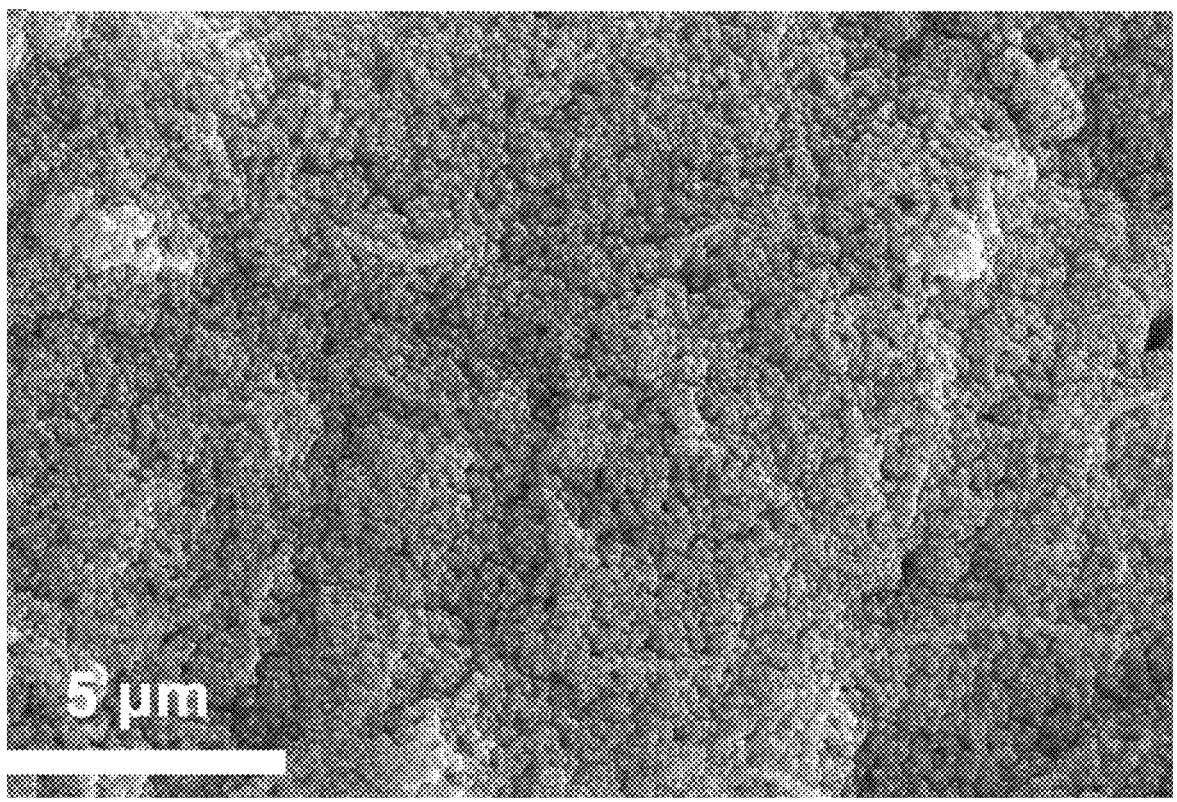
FIG. 13 is the scanning electron microscope image of ZIF-76 glass membrane.
Figure 14:
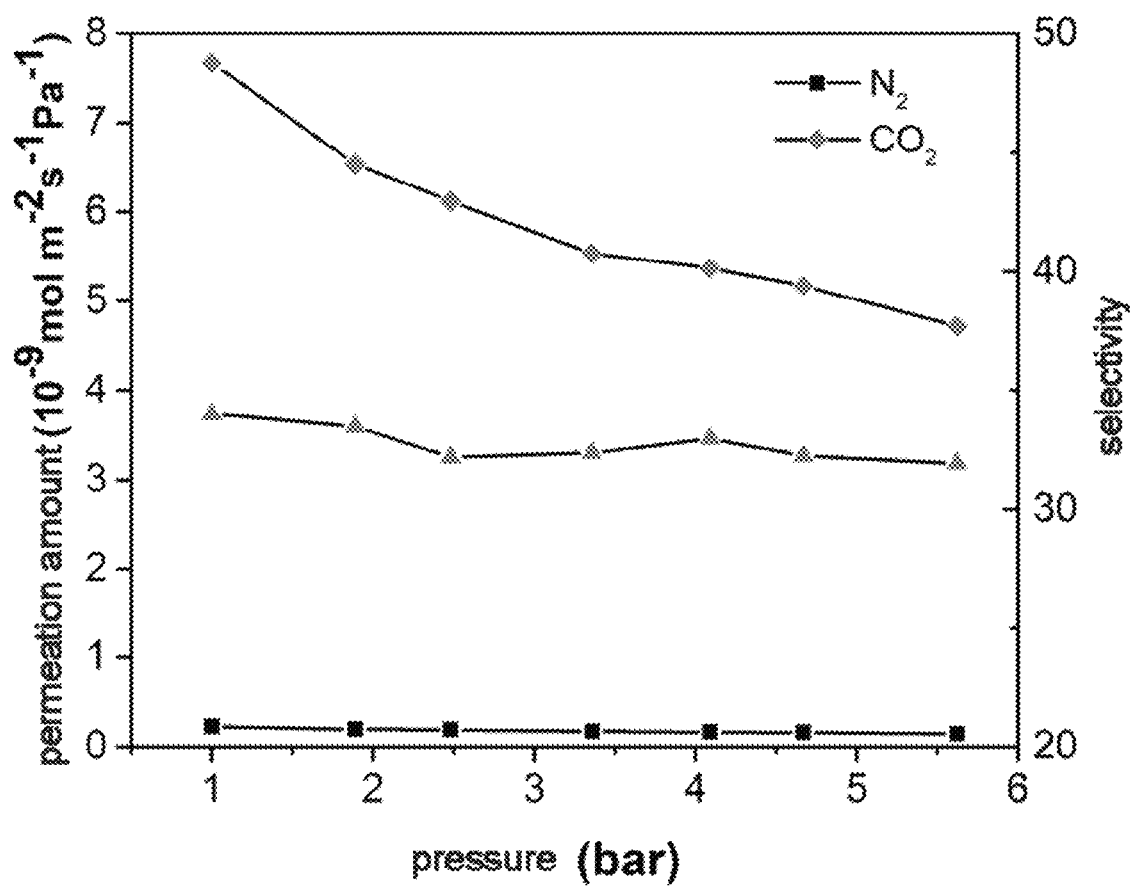
FIG. 14 is the chart showing the separation performance of ZIF-76 glass membrane for $CO_2/N_2$.

Comparing the X-ray diffraction pattern of the ZIF-76 glass membrane (FIG. 12) with the X-ray diffraction pattern of the ZIF-76 seed layer (FIG. 10), the results show that after ZIF-76 undergoes a melting process, the topological structure of lta is transformed into an amorphous structure. It can be seen from the scanning electron microscope image (FIG. 13) of the ZIF-76 glass membrane that during the melting process of ZIF-76, the crystal melts, and the crystal morphology changes and spreads into a continuous membrane at high temperature. The Wicke-Kallenbach technique is used to test the $CO_2/N_2$ separation performance of the obtained ZIF-76 glass membrane (FIG. 14). On the upstream side of the membrane, a mixed gas of $CO_2$ and $N_2$ is introduced in a molar ratio of 1:1, and helium is introduced to the downstream side of the membrane for purging. The ZIF-76 glass membrane of the present invention has a permeation amount of 30-40 GPU and a selectivity of 20 at normal temperature.

Example 4

Preparation of Supported ZIF-4 Glass Membrane:
(1) Growth of seed crystals: Mix zinc nitrate hexahydrate, imidazole, and DMF uniformly in a molar ratio of 1:15:200. Put 10 mL of the solution in a 25 mL beaker, place a 70 nm α-$Al_2O_3$ support sheet at the bottom of the beaker and leave it to stand still for 48 h.
(2) Melt-quenching: Dry the support sheet with the grown seed layer at 100° C. for 2 h, and then transfer the support sheet to a tube furnace, and increase the temperature from room temperature to 580° C. at a heating rate of 10° C./min under the protection of argon, and then stop the heating, and rapidly cool the support sheet to room temperature.

Figure 15:
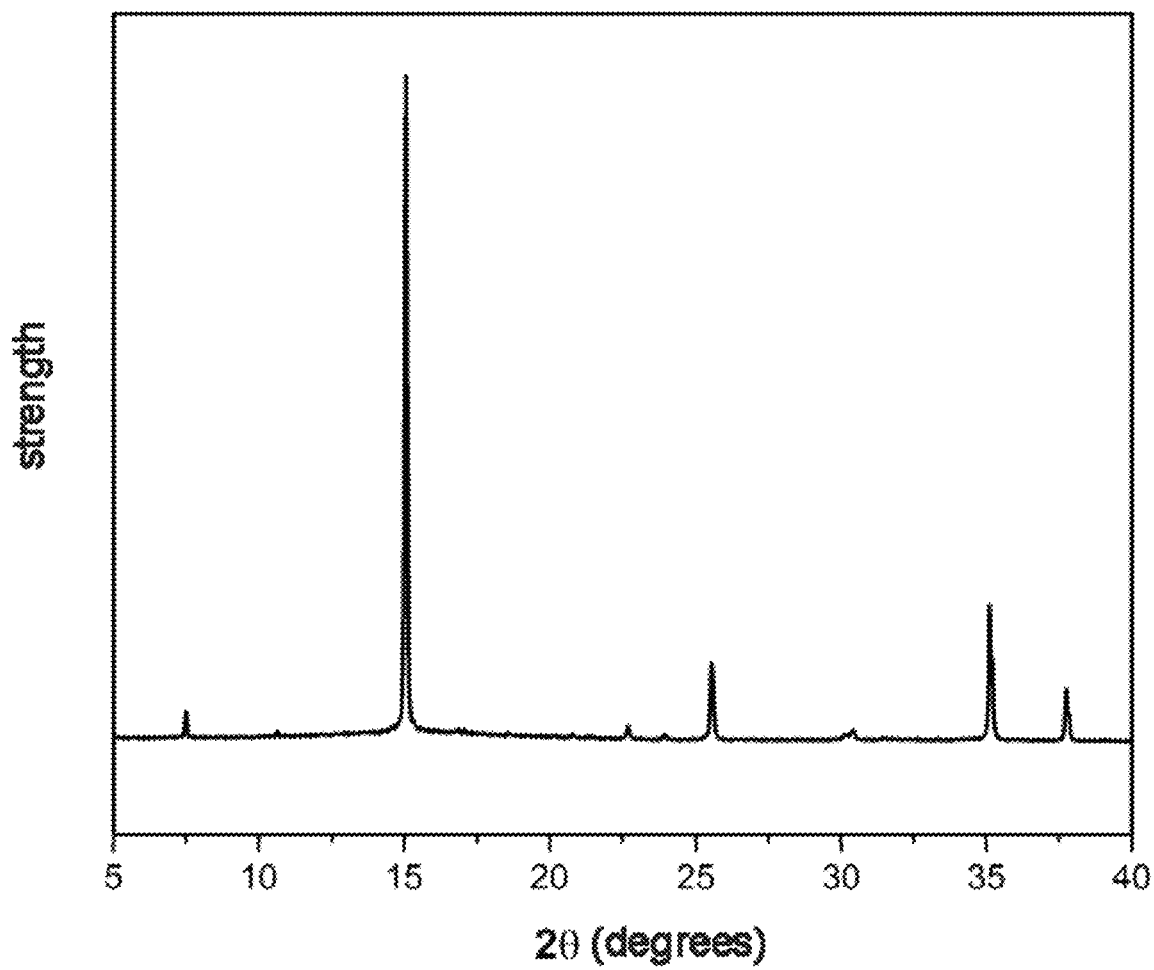
FIG. 15 is the X-ray diffraction measurement result chart of ZIF-4 glass membrane (containing a ZIF-zni phase).

Before ZIF-4 decomposes at 600° C., a short crystal melting process occurs. Unlike ZIF-62, ZIF-4 crystal first changes from a cag topology to an amorphous structure as the temperature increases, then is recrystallized at 500-550° C. to transform into a zni topology, and finally is melted until decomposed. According to an analysis, since the temperatures at each stage are relatively close, the obtained glass membrane is doped with a large amount of crystalline parts of ZIF-zni (FIG. 15). The crystalline phase and the glass phase coexist, and gaps could be easily formed at the phase interface, causing defects, The selectivity of the membrane to $CO_2/N_2$ is only 1.5, and the membrane has no separation performance.

Example 5

Preparation of Supported GIS Glass Membrane:
(1) Growth of seed crystals: Cited Document (DOI: 10.1073/pnas.0602439103): Mix zinc nitrate tetrahydrate and imidazole uniformly in a ratio of 10:1. Put 10 mL of the solution in a 25 mL beaker, place a 70 nm α-$Al_2O_3$ support sheet at the bottom of the beaker and leave it to stand still for 48 h.
(2) Melt-quenching: Dry the support sheet with the grown seed layer at 100° C. for 2 h, and then transfer the support sheet to a tube furnace, and increase the temperature from room temperature to 580° C. at a heating rate of 10° C./min under the protection of argon, and then stop the heating, and rapidly cool the support sheet to room temperature.

During the sintering process, GIS is directly melted from the amorphous phase to a liquid at 580° C. However, because the melting point is close to the decomposition temperature, a part of the material on the surface of the membrane is thermally decomposed at 580° C., resulting in defects in the membrane, and the membrane does not have an effect of separation.

Example 6

Preparation and Performance Testing of Different MOFs Materials
(1) Preparation of ZIF-4/ZIF-62/ZIF-76/GIS Powder
   Preparation of ZIF-4 powder: Mix zinc nitrate hexahydrate, imidazole, and DMF uniformly in a molar ratio of 1:5:200 to obtain ZIF-4 synthesis liquor. Put 50 mL of the synthesis liquor in the reactor, react at 130° C. for 48 h, use fresh DMF to wash the product three times and dry the product in vacuum at 100° C. to obtain ZIF-4 powder.
   Preparation of ZIF-62 powder: Mix zinc nitrate hexahydrate, imidazole, benzimidazole, and DMF uniformly in a molar ratio of 1:12.5:3:200 to obtain ZIF-62 synthesis liquor. Put 50 mL of the synthesis liquor in the reactor, react at 130° C. for 48 h, use fresh DMF to wash the product three times and dry the product in vacuum at 100° C. to obtain ZIF-62 powder.
   Preparation of ZIF-76 powder: Mix zinc nitrate hexahydrate, imidazole, 5-methylbenzimidazole, and DMF uniformly in a molar ratio of 1:2:2:200 to obtain ZIF-76 synthesis liquor. Put 50 mL of the synthesis liquor in the reactor, react at 130° C. for 48 h, use fresh DMF to wash the product three times and dry the product in vacuum at 100° C. to obtain ZIF-76 powder.
   Preparation of GIS powder: Mix zinc nitrate tetrahydrate, imidazole, and DMF uniformly in a molar ratio of 10:1:200 to obtain GIS synthesis liquor. Put 50 mL of the synthesis liquor in the reactor, react at 130° C. for 48 h, use fresh DMF to wash the product three times and dry the product in vacuum at 100° C. to obtain GIS powder.

(2) Preparation of Supported Crystalline ZIF-4/ZIF-62/ZIF-76/GIS Material by the In-Situ Growth Method:
A 70 nm α-$Al_2O_3$ sheet is selected as the support, the support sheet is washed with distilled water and ethanol, and then the support sheet is placed in the same synthesis liquor as in step (1), reacted at 130° C. to grow for 48 h, and dried in vacuum at 100° C. to obtain four kinds of supported crystalline metal organic framework material, respectively recorded as crystalline ZIF-4A, crystalline ZIF-62A, crystalline ZIF-76A, and crystalline GISA.

(3) Preparation of Supported Crystalline ZIF-4/ZIF-62/ZIF-76/GIS Material by the Vacuum-Assisted Method:
A 70 nm α-$Al_2O_3$ sheet is selected as the support, and the support sheet is washed with distilled water and ethanol and set aside.

Disperse 0.05 g of each of the four kinds of metal organic framework powder prepared in step (1) into 10 ml of methanol solvent, and ultrasonically disperse for 15 min to obtain a dispersion. Fix the support on a funnel, add 10 ml of the dispersion to the upstream side of the support, and evacuate the downstream side of the support, wait until all the liquid on the upstream side is drained, take off the support sheet, and dry the support sheet in vacuum at 100° C. to obtain four kinds of supported crystalline metal organic framework material, respectively recorded as crystalline ZIF-4B, crystalline ZIF-62B, crystalline ZIF-76B, crystalline GISB.

(4) Vitrification of Powder MOF Materials by the Tablet Pressing and Sintering Method
Take 0.1 g of each of the four kinds of MOF powder prepared in step (1), increase the pressure at the upper end of the mold of the powder tablet pressing machine to 15 Mpa, and hold each kind of powder therein for 15 min to obtain a self-supporting metal organic framework material sheet. Transfer the self-supporting metal organic framework material sheet to a tube furnace, and increase the temperature from room temperature to the melting temperature (Table 1) of each of the four kinds of crystalline metal organic framework material at a heating rate of 10° C./min under the protection of argon, and then stop the heating, and rapidly cool the sheet to room temperature to obtain the four kinds of MOF glass sintered pieces, which are respectively recorded as ZIF-4 glass sintered pieces, ZIF-62 glass sintered pieces, ZIF-76 glass sintered pieces and GIS glass sintered pieces.

TABLE 1

| | crystalline metal organic framework material | | | |
|---|---|---|---|---|
| | ZIF-4 | ZIF-62 | ZIF-76 | GIS |
| melting temperature (° C.) | 600 | 450 | 470 | 600 |

(5) Vitrification of MOF Materials by the Melt-Quenching Method
Transfer each of the eight kinds of supported crystalline MOF material made in step (2) and step (3) to a tube furnace independently, and increase the temperature from room temperature to the melting temperature (Table 2) of the crystalline metal organic framework material at a heating rate of 10° C./min under the protection of argon, and then stop the heating, and rapidly cool the material to room temperature to obtain the eight kinds of supported metal organic framework glass composite membrane, which are respectively recorded as ZIF-4 glass membrane A, ZIF-62 glass membrane A, ZIF-76 glass membrane A, GIS glass membrane A, ZIF-4 glass membrane B, ZIF-62 glass membrane B, ZIF-76 glass membrane B, GIS glass membrane B.

TABLE 2

| crystalline metal organic framework material | melting temperature (° C.) |
| --- | --- |
| crystalline ZIF-4A | 590 |
| crystalline ZIF-62A | 450 |
| crystalline ZIF-76A | 460 |
| crystalline GISA | 590 |
| crystalline ZIF-4B | 590 |
| crystalline ZIF-62B | 450 |
| crystalline ZIF-76B | 460 |
| crystalline GISB | 590 |

(6) Performance Measurement of Material
a. Measurement of the Melting Point of Crystalline Metal Organic Framework
  Measurement method: differential scanning calorimetry method
  Measurement target: ZIF-4 powder, ZIF-62 powder, ZIF-76 powder, GIS powder
  Measurement result: as shown in Table 3

TABLE 3

| | crystalline metal organic framework material | | | |
| --- | --- | --- | --- | --- |
| | ZIF-4 | ZIF-62 | ZIF-76 | GIS |
| melting temperature (° C.) | 581 | 434 | 461 | 578 |

B. Measurement of Crystal Structure of Crystalline Metal Organic Framework
  Measurement method: X-ray diffraction method
  Measurement target: ZIF-4 powder, ZIF-62 powder, ZIF-76 powder, GIS powder, crystalline ZIF-4A, crystalline ZIF-62A, crystalline ZIF-76A, crystalline GISA, crystalline ZIF-4B, crystalline ZIF-62B, crystalline ZIF-76B, crystalline GISB.
  The measurement results are shown in Table 4.

TABLE 4

| crystalline metal organic framework material | topology | match results with crystallographic data |
| --- | --- | --- |
| ZIF-4 powder | cag | match |
| ZIF-62 powder | cag | match |
| ZIF-76 powder | lta | match |
| GIS powder | gis | match |
| crystalline ZIF-4A | cag | match |
| crystalline ZIF-62A | cag | match |
| crystalline ZIF-76A | lta | match |
| crystalline GISA | gis | match |
| crystalline ZIF-4B | cag | match |
| crystalline ZIF-62B | cag | match |
| crystalline ZIF-76B | lta | match |
| crystalline GISB | gis | match | c. Performance Measurement of Metal Organic Framework Glass Membrane:
  Measurement method: Wicke-Kallenbach technique, wherein the mixed gas is introduced in a molar ratio of 1:1 on the upstream side of the membrane, the downstream side of the membrane is purged with helium gas, and the gas composition on the downstream side is analyzed by chromatography to calculate the flux and selectivity of the membrane.
  Measurement target: ZIF-4 glass sintered pieces, ZIF-62 glass sintered pieces, ZIF-76 glass sintered pieces, GIS glass sintered pieces, ZIF-4 glass membrane A, ZIF-62 glass membrane A, ZIF-76 glass membrane A, GIS glass membrane A, ZIF-4 glass membrane B, ZIF-62 glass membrane B, ZIF-76 glass membrane B, and GIS glass membrane B.
  Measurement results are specifically shown in Table 5:
  1. No gas penetration is detected on the downstream side of the device for ZIF-4 glass sintered pieces, ZIF-62 glass sintered pieces, ZIF-76 glass sintered pieces, GIS glass sintered pieces.
  2. The membrane selectivity of ZIF-4 glass membrane A, GIS glass membrane A, ZIF-4 glass membrane B, and GIS glass membrane B are all lower than 2, and the membranes are defective and have no separation effect.
  3. The ZIF-62 glass membrane A, ZIF-76 glass membrane A, ZIF-62 glass membrane B, and ZIF-76 glass membrane B have separation effects.

TABLE 5

| | separation mixture | flux (mol m$^{-2}$ s$^{-1}$ pa$^{-1}$) | selectivity |
| --- | --- | --- | --- |
| ZIF-62 glass membrane A | $H_2/CH_4$ | $2 \times 10^{-8}$ | 50 |
| ZIF-76 glass membrane A | $CO_2/N_2$ | $8 \times 10^{-9}$ | 33 |
| ZIF-62 glass membrane B | $H_2/CH_4$ | $2 \times 10^{-8}$ | 36 |
| ZIF-76 glass membrane B | $CO_2/N_2$ | $6 \times 10^{-9}$ | 26 |

The invention claimed is:

1. A preparation method of metal organic framework glass membrane, comprising:
  forming a crystalline metal organic framework material;
  heating the crystalline metal organic framework material to a temperature at or above a melting point thereof and below a decomposition temperature thereof at a rate of 1-15° C./min; and
  cooling the heated crystalline metal organic framework material,
  wherein the crystalline metal organic framework material comprises a metal node and a first ligand, the metal node is selected from a zinc ion, a cobalt ion, or a mixture thereof,
  the first ligand is imidazole or phosphoric acid, and
  the melting point is in a range of 370-600° C.

2. The method according to claim 1, wherein the crystalline metal organic framework material comprises a second ligand selected from benzimidazole, 2-methylbenzimidazole, 5-methylbenzimidazole, 5,6-dimethylbenzimidazole, 5-chlorobenzimidazole, 5-hydroxybenzimidazole, and triazole.

3. The method according to claim 2, wherein the second ligand is selected from benzimidazole, 5-methylbenzimidazole, and 5-chlorobenzimidazole.

4. The method according to claim 3, wherein the first ligand is imidazole.

5. The method according to claim 1, wherein the rate of heating is 8-10° C./min.

6. The method according to claim 1, wherein the crystalline metal organic framework material is synthesized in a solution comprising zinc ions, cobalt ions, or a mixture thereof, the first ligand, the second ligand, and an organic solvent, wherein a molar ratio of the first ligand, the second ligand, and the organic solvent is 1:4.5-30:0-5:100-500, and the organic solvent is selected from N,N-dimethylformamide, N,N-dimethylacetamide, water, methanol, ethanol, and a mixture thereof.

7. The method according to claim 1, wherein the crystalline metal organic framework material is supported on a support having a pore diameter of 70 nm-1 µm.

8. The method according to claim 7, wherein the support is made of a material selected from $\alpha$-$Al_2O_3$, $\gamma$-$Al_2O_3$, $TiO_2$, and stainless steel.

9. A metal organic framework glass membrane prepared using the method according to claim 1.

* * * * *